June 12, 1934.  W. K. ROSE  1,962,411
AIRPLANE
Filed July 13, 1933  3 Sheets-Sheet 1
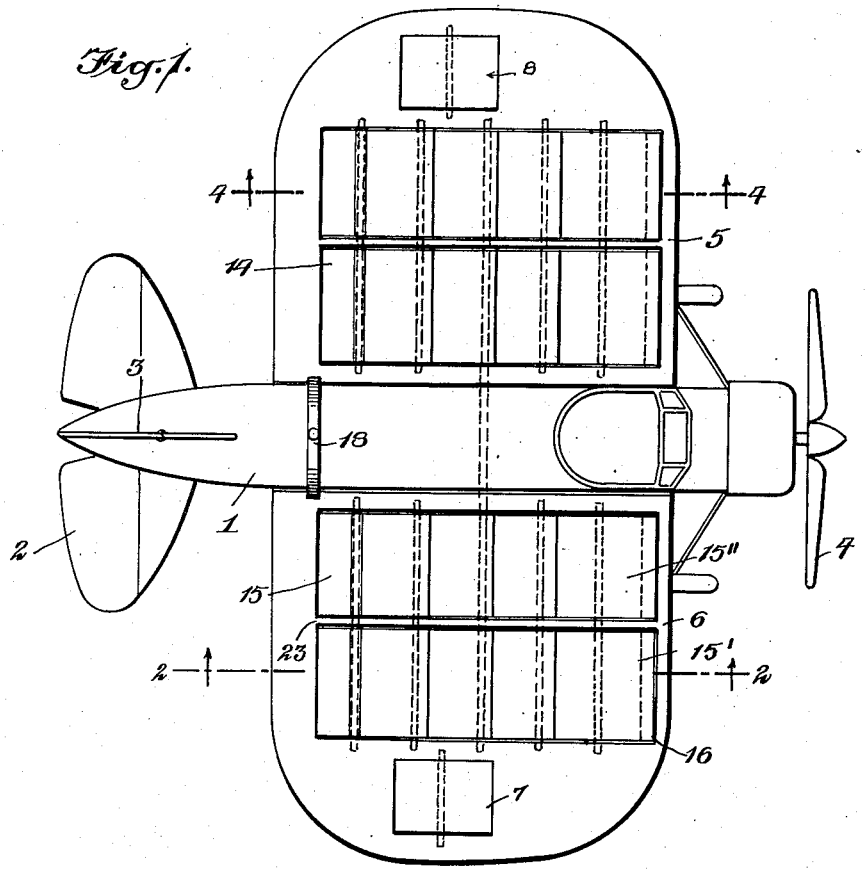
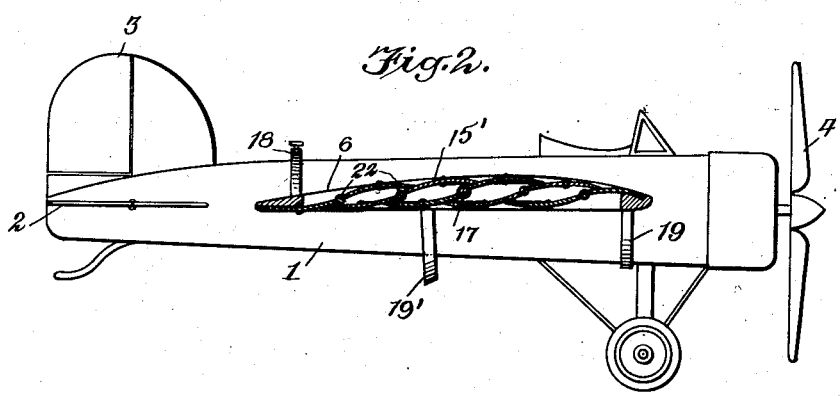
WITNESSES
INVENTOR
William K. Rose
BY
ATTORNEYS June 12, 1934.    W. K. ROSE    1,962,411
AIRPLANE
Filed July 13, 1933    3 Sheets-Sheet 2
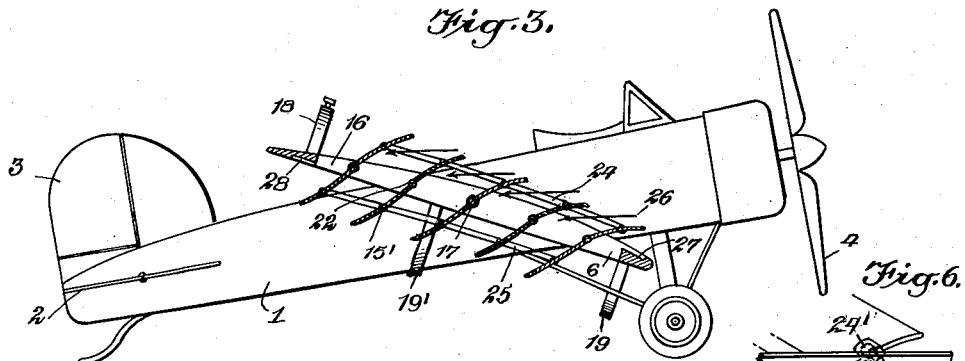
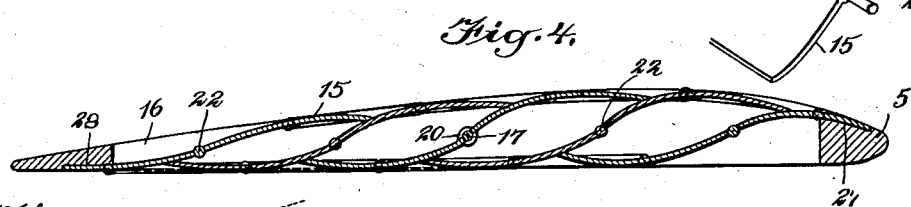
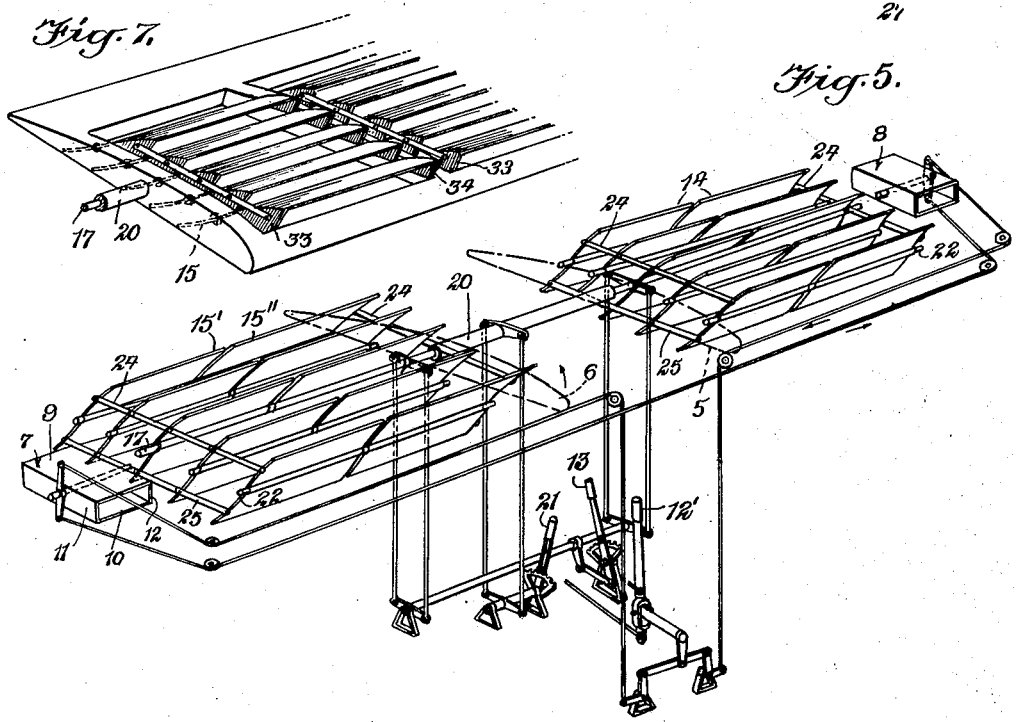
WITNESSES
INVENTOR
William K. Rose
BY
ATTORNEYS June 12, 1934.  W. K. ROSE  1,962,411
AIRPLANE
Filed July 13, 1933  3 Sheets-Sheet 3

WITNESSES

INVENTOR
William K. Rose
BY
ATTORNEYS

Patented June 12, 1934

1,962,411

UNITED STATES PATENT OFFICE 1,962,411

AIRPLANE

William K. Rose, New York, N. Y.

Application July 13, 1933, Serial No. 680,287

14 Claims. (Cl. 244—12)

This invention relates to airships and particularly to an improved airplane, and has for an object to provide an improved construction wherein the wing structures may be swung on a longitudinal axis.

Another object of the present invention is to provide an airplane with a tilting wing and with vanes or shutters in each wing swingable on axes substantially parallel to the center of the wing so as to produce a lifting action when the wing is tilted to any extent below a horizontal line.

A further object, more specifically, is to provide an airplane with tiltable wings and independently tiltable or swingable vanes or shutters in each wing arranged either longitudinally of the wing structures or at an angle thereto.

In the accompanying drawings—

Figure 1 is a top plan view of an airplane disclosing an embodiment of the invention;

Figure 2 is a sectional view through Figure 1 approximately on the line 2—2;

Figure 3 is a view similar to Figure 2 but showing the wing structure tilted downwardly with the vanes swung upwardly;

Figure 4 is an enlarged sectional view through Figure 1 approximately on the line 4—4;

Figure 5 is a diagram in perspective illustrating suitable controls for swinging the vanes shown in Figure 3 and for causing the ailerons to function;

Figure 6 is a detailed fragmentary perspective view showing one of the actuating bars for the auxiliary wings and how the same are actuated by a universal or socket joint;

Figure 7 is a detailed perspective view showing a modified form of the structure illustrated in Figure 3, the same showing a structure presenting confining end plates for each auxiliary wing;

Figure 8:
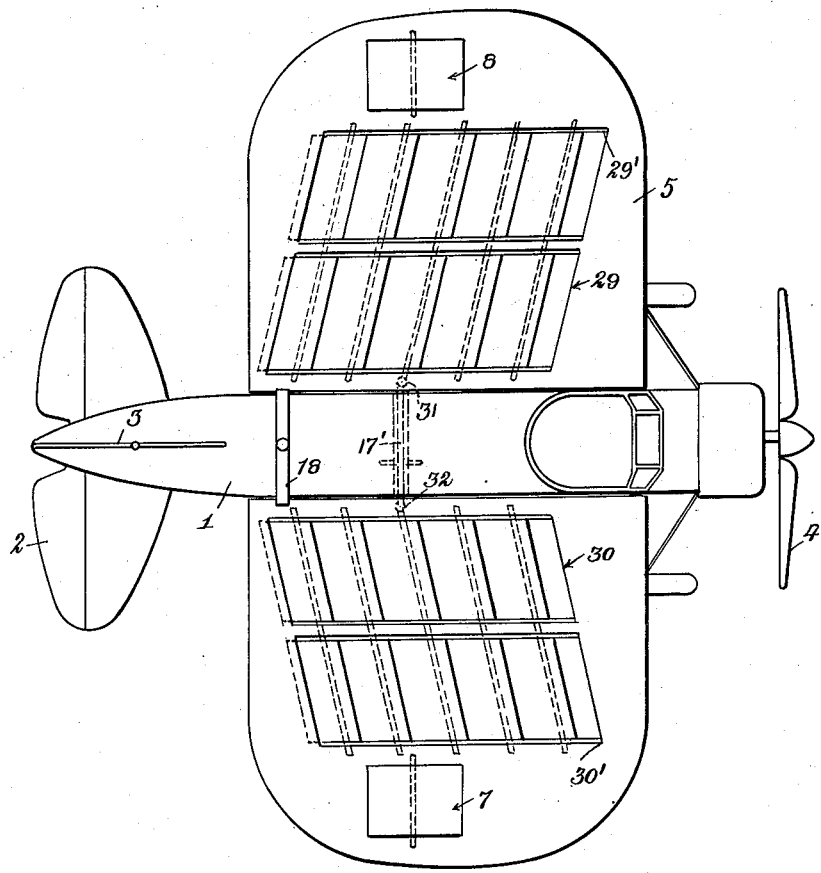
Figure 8 is a view similar to Figure 1 showing a modified form of the invention.

Referring to the accompanying drawings by numerals, 1 indicates a fuselage of any desired type provided with the usual elevators 2 and rudder 3, as well as a suitable engine for driving the propeller 4. Airfoils or wings 5 and 6 are connected with the fuselage 1 so that when the airship is in ordinary flight it will appear substantially as shown in Figure 2 and will function in the usual manner of airplanes now in use.

However, the respective wing structures and ailerons are entirely different from those now in use and are adapted to accomplish the same results as the ordinary structures in use today and, in addition, other results not accomplished by well known structures on the market. The respective ailerons 7 and 8 may be known as box ailerons because each aileron is provided with an upper plate 9 and a lower plate 10 with an open space therebetween. Preferably side plates 11 and 12 are also provided. These ailerons assume substantially the shape of the wing at the point where they are mounted and when in inoperative position they fill out the wing structure, but when tilted upwardly or downwardly they present surfaces for directing air upwardly or downwardly and provide a drag or lift, as the case may be, so as to secure the desired balancing and banking action. They are controlled through the usual control or joy stick 12' in the usual manner by substantially the usual arrangement of cables.

In addition to this special form of aileron there are provided auxiliary wings or special vanes, shutters or little wings 14 and 15. It will be understood, of course, that instead of using the special ailerons just described, others could be used without departing from the spirit of the invention, though this special aileron is preferable because it coacts with the auxiliary wings 14 and 15 to secure additional results when the airplane is moving upwardly or downwardly. As structures 14 and 15 are identical a description of one will apply to both. As illustrated particularly in Figures 3 and 5, the wing structure 6 is provided with an opening 16 and in this opening there are two sets of auxiliary wings 15' and 15'', said auxiliary wings being of substantially identical construction. A main supporting shaft 17 is rotatably supported by the fuselage 1 and extends through the structures 14 and 15 and through suitable journal members in the various wings 5 and 6 whereby these wings are properly pivotally or swingably supported. An arc-shaped brace or strap 18 is connected to the wings 5 and 6 near the rear, and a similar strap 19 is connected to the wings near the front so as to limit the upward swinging movement of the leading edge. In addition to the straps 18 and 19 there is provided a third strap 19' which acts to prevent the leading edge from tilting downwardly too far, and also from preventing the trailing edge from tilting upwardly too far.

In Figure 2 is shown the parts in their extreme upward swinging movement. This is the position where the wing structure remains as the airship travels through the air in the usual way, and even when it moves upwardly or downwardly slightly. However, when desired, the wing structures are tilted to the position shown in Figure 3, or to some other position intermediate according to the circumstances. A sleeve 20 surrounds shaft 17 and is connected with the wing structure 6 but not to the shutters or auxiliary wings as shown in Figures 3 and 5. Preferably the shaft 17 is rigidly secured to the central auxiliary wings 15' and 15" and the various remaining auxiliary wings are supported by suitable journal shafts 22 on the wing 6. In order to provide a proper support for the various auxiliary wings they are made in two parts, namely, parts 15' and 15", whereby shaft 17 and also journal shafts 22 are supported by a centrally positioned bar 23. The central auxiliary wings 15' and 15" are identical to the remaining auxiliary wings, except that they are secured to shaft 17, whereby as this shaft is actuated by the control lever 13 these auxiliary wings will also be actuated. In order to transmit power from the central auxiliary wings to the remaining auxiliary wings or shutters the bars 24 and 25 are pivotally connected to the respective auxiliary wings, as shown particularly in Figure 3. The bars 24 and 25 may be pivotally connected to the auxiliary wings in any desired manner as, for instance, an ordinary stub shaft extending from the auxiliary wings, or by a ball and socket connection 24', as shown in Figure 6. This ball and socket construction is very desirable in the structure shown in Figure 8 as it helps to take care of the different movements involved as the various auxiliary wings function. In view of the fact that the auxiliary wings are divided and supported centrally by the supporting bar 23, the bars 24 and 25 are arranged to connect the auxiliary wings near the fuselage and a similar set near the aileron.

It will be understood that the shafts 22 are not divided but extend through bar 23 so as to be supported thereby as well as by the wing 6. It will also be understood that other forms of support could be provided and the various detailed structures modified without departing from the spirit of the invention, provided the various auxiliary wings are opened and closed at will and to any desired extent. In order to secure the best action the various auxiliary wings are formed in cross section as a flattened S whereby there will be a minimum amount of drag on the lower part and a maximum amount of lift on the upper part as the wind from the propeller 4 strikes the auxiliary wings when moving as indicated by the arrows 26.

It will be seen that when the control lever 13 is pulled rearwardly the wing structures will be moved to the position shown in Figure 3, or to some other intermediate position if the movement is small. When the lever 13 is forced forwardly the wing structures will gradually move from the position shown in Figure 3 to that shown in Figure 2, which is normal flying position. The parts are locked in this position by any suitable means as shown in Figure 5, and the airplane then functions in the usual manner now well known. When it is desired to use the auxiliary wings, the wing structures 5 and 6 are swung downwardly to any desired extent as, for instance, to the position shown in Figure 3, and then lever 21 is moved to force the shutters or auxiliary wings upwardly or open, whereby the air may enter as indicated by the arrows 26, thus giving a lifting action even though the airplane may be landing.

By moving the lever 21 in the opposite direction the auxiliary wings may be closed so that they will assume the position shown in Figure 4. While the auxiliary wings or shutters and the wing structures are operable independently, it is possible to operate them simultaneously by simultaneously operating the levers 13 and 21. The ailerons and elevator are operated by the usual control lever or joy stick 12' which functions in the usual manner. It will be noted that the joy stick 12' is free to move in any direction at all times, but preferably levers 13 and 21 are locked in their various adjusted positions so as to lock the wing structures either in the position shown in Figure 3 or in that shown in Figure 2, and also lock the auxiliary wings either open or closed. When closed, by reason of their shape they present minimum resistance as shown in Figure 4. It will be noted that the upper edge of the first auxiliary wing fits into a depression 27 in the leading edge of the wing structure, and the lower edge of the last auxiliary wing fits into a depression 28 near the trailing edge of the wing structure. When folded as shown in Figures 2 and 4 the auxiliary wings present very little drag or resistance. When open they provide a decided lift when the airplane is moving upwardly or when it is landing. By properly tilting the wings when landing, the propeller 4 may be maintained at comparatively high speed and yet the airplane caused to land slowly and gently. It will thus be seen that the use of the structures 14 and 15 as shown in Figure 1 performs two principal functions, namely, to permit the airplane to rise at a very steep angle when ample power is provided, and also to permit the airplane to land at a slow speed while not interfering with the usual speed in ordinary flight.

It will be understood that numerous changes in the control apparatus and other details may be made without departing from the spirit of the invention. However, the principle of providing an additional lift during landing as well as rising is important and the structure illustrating this principle is included in the invention. As shown in Figures 1 to 5, inclusive, the auxiliary wings 14 and 15 extend parallel to the leading edge of the wing structures 5 and 6. However, these members may be arranged differently as shown in Figure 8. In Figure 8 this form of the invention provides shutter or auxiliary wing structures 29 and 30 substantially the same as that shown in Figure 1, but they are arranged at an angle to the leading edge so that the first corners 29' and 30' of each of the auxiliary wing structures may be brought into the wind first and then gradually the remaining parts of the auxiliary wing structures. The same arrangement of bars 24 and 25 is used in this form of the invention, and also either the same or any desired control may be used. However, it is necessary to provide universal joints 31 and 32 in the main shaft 17'.

In Figure 7 a modified form of the invention is shown wherein the structure is identical to that shown in Figures 1 to 4 inclusive, except that each of the auxiliary wings are provided with end plates 33 and 34 which confine the air striking the auxiliary wings whereby a full lifting effect is secured. It will be understood that the plates 34 and 35 are only connected to the upper half of the respective auxiliary wings.

I claim:—

1. An airplane of the character described including a fuselage and a pair of wings, each of said wings having an opening extending therethrough, a shaft for rotatably supporting said wings, said wings being adapted to rotate in a plane at right angles to their longitudinal axes, means for limiting the rotation of the wings, a plurality of auxiliary wings in each of said openings, and means for opening and closing said auxiliary wings independently of the wing structures.

2. An airplane including a wing structure, said wing structure comprising two wing members, means for rotatably supporting said wing members whereby they may be tilted to different angles with respect to the horizontal, each of said wing members having an opening almost as large as the wing member, a plurality of pivotally mounted auxiliary wings arranged in said openings and adapted to close the opening when in folded position and to be arranged at an angle to the surface of the wing member when open, whereby when landing or rising air may strike the auxiliary wings to produce a lifting action.

3. An airplane including a fuselage with a wing member on each side of the fuselage, each of said wing members having an opening almost the size of the wing member, means for pivotally mounting the wing members on the fuselage, means for swinging the wing members in either of two directions, means for limiting the swinging movement in both directions, a plurality of pivotally mounted auxiliary wings arranged in said openings, means for causing said auxiliary wings to be nested within the openings, said last mentioned means being manually actuated for moving said auxiliary wings to a position at an angle to the surface of the wing members.

4. An airplane including a wing structure having an opening therein, a plurality of auxiliary wings arranged in said opening, said auxiliary wings being pivotally mounted and connected together to swing simultaneously, said auxiliary wings substantially presenting an S-shaped construction in cross section, means for swinging said auxiliary wings to an open position, and means for swinging the wing structures downwardly.

5. An airplane of the character described including a wing structure having a pivotal support whereby it can be swung at different angles while in flight, a plurality of auxiliary wings arranged in said wing, means for pivotally supporting said auxiliary wings, said auxiliary wings being of a width greater than the thickness of the wing structure whereby when the auxiliary wings are moved to an open position they will project above and below the wing structure, means for opening said auxiliary wings, and means for manually swinging said wing structure downwardly and upwardly.

6. An airplane including a pivotally mounted wing structure having an opening therein, a plurality of auxiliary wings normally nested within said opening, means for swinging said auxiliary wings so that the upper part will project above the wing structure and extend at an angle other than a right angle thereto, whereby the forward movement of the airplane and the propeller motion will cause air to strike the auxiliary wings and produce a lifting action.

7. An airplane of the character described including a fuselage, a pair of wing structures, means for swingably mounting the wing structures on the fuselage, each of said wing structures having an opening therein occupying most of the wing structure, a plurality of auxiliary wings nested in the respective openings, means for pivotally mounting the respective auxiliary wings, means for swinging the auxiliary wings so that the upper ends will project above the wing structure, and an aileron normally extending forwardly and rearwardly while swingable at different angles as desired.

8. An airplane including a fuselage, a wing member on each side of the fuselage, each of said wing members having an opening therein for most of the surface thereof, a plurality of pivotally mounted auxiliary wings arranged in each of said openings, said auxiliary wings being arranged at an angle to a longitudinal line drawn through the center of both wing members, and means for swinging said auxiliary wings so that the upper part will be moved above the upper surface of the wing members, said movement causing one corner of each auxiliary wing to first project above the wing member and then gradually the remaining parts until the auxiliary wings are fully opened.

9. An airplane including a fuselage, a pair of wing members, each wing member having an opening therein, a plurality of auxiliary wings pivotally mounted in each of said openings, said auxiliary wings being positioned so that their axes will be at an angle other than a right angle to the axis of the fuselage, means for tilting said wing members, and means for raising said auxiliary wings to project above the wing members.

10. An airplane including a wing structure having an opening therein, a plurality of auxiliary wings arranged in said opening, said auxiliary wings being pivotally mounted and connected together to swing simultaneously, said auxiliary wings being substantially convex, manually actuated means for swinging said auxiliary wings to open position, and manually actuated means for swinging said wing structure so that the leading edge will be positioned at any desired point between the substantially horizontal position and substantially a forty-five degree angle from the horizontal position.

11. An airplane of the character described including a fuselage and a pair of wings, each wing having an opening extending therethrough, a shaft for rotatably supporting said wings, said wings being adapted to rotate in a plane at right angles to their longitudinal axes, means for rotating said wings, a plurality of auxiliary wings positioned in each of said openings formed to present a camber on top when closed, and means for opening and closing said auxiliary wings independently of the wing structures.

12. In an airplane having a propeller, a movable main wing, auxiliary wings carried by the main wing movable within the air stream from said propeller to different angles in relation to the air stream so as to direct the air stream downwardly, and manually actuated independent means for moving said main wing and the auxiliary wings.

13. In an airplane having a propeller, a main wing swingable on an axis, a plurality of auxiliary wings carried by said main wing and movable into and out of the air stream from said propeller whereby said auxiliary wings will vary in height from the front auxiliary wing to the rear auxiliary wing so that the front auxiliary wing will not blanket the rear auxiliary wings from said air stream.

14. In an airplane, a main wing positioned to swing on an axis, a plurality of auxiliary wings pivotally mounted on said main wing and extending above and below the main wing when in one position, and a plate secured to each auxiliary wing at each end for confining the air stream to the respective auxiliary wings.

WILLIAM K. ROSE.